United States Patent
Lai et al.

(10) Patent No.: US 10,943,433 B2
(45) Date of Patent: Mar. 9, 2021

(54) SYSTEM MANAGED PLAYER GROUP PLAY POOLS

(71) Applicant: IGT, Las Vegas, NV (US)

(72) Inventors: Vincent Lai, Las Vegas, NV (US); Patrick Danielson, Las Vegas, NV (US); Samantha Ascheri-Phillips, Reno, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/407,481

(22) Filed: May 9, 2019

(65) Prior Publication Data
US 2020/0357239 A1 Nov. 12, 2020

(51) Int. Cl.
*G07F 17/32* (2006.01)
*G06Q 20/36* (2012.01)
*G06Q 20/32* (2012.01)
*G06Q 50/34* (2012.01)
*G06Q 20/10* (2012.01)

(52) U.S. Cl.
CPC ......... *G07F 17/3258* (2013.01); *G06Q 20/10* (2013.01); *G06Q 20/3223* (2013.01); *G06Q 20/36* (2013.01); *G06Q 50/34* (2013.01); *G07F 17/3237* (2013.01)

(58) Field of Classification Search
None
See application file for complete search history.

(56) References Cited

U.S. PATENT DOCUMENTS

| | | | |
|---|---|---|---|
| 2011/0269548 A1* | 11/2011 | Barclay | G07F 17/3225 463/42 |
| 2012/0270623 A1* | 10/2012 | Walker | G07F 17/3274 463/12 |
| 2017/0092054 A1* | 3/2017 | Petersen | G07F 17/3211 |

* cited by examiner

*Primary Examiner* — James S. McClellan
*Assistant Examiner* — Peter J Iannuzzi
(74) *Attorney, Agent, or Firm* — Sheridan Ross PC

(57) ABSTRACT

According to one embodiment, managing a player pool can comprise receiving a request to initiate a player pool and generating a record defining the player pool and defining a rule for the player pool. The rule can define handling of results of gaming activity in which members of the player pool participate and handling of a player pool amount at an occurrence of a predetermined event. Requests can be received from participants to participate in the player pool and the record defining the player pool can be updated to indicate addition of the participants. An indication of a contribution amount made by each participant can also be received and the record can be updated to increment the player pool amount based on the contributions. Gaming activity of the participants can be monitored and the player pool amount can be updated based on the monitor and the rule for the player pool.

20 Claims, 8 Drawing Sheets

SYSTEM MANAGED PLAYER GROUP PLAY POOLS

BACKGROUND

Embodiments of the present disclosure relate generally to managing game play on electronic gaming systems and more particularly to managing player pools for users of electronic gaming systems.

People often visit casinos or other gaming venues as part of a social event or activity. For example, a married couple or members of a family may visit Las Vegas or other location to play gambling games at a casino or other venue. In other cases, members of a tour group, participants in a convention, or other similar groups may also visit such locations and gamble any of a variety of games. To increase an incentive to play such games and thereby increase potential revenues to the casino or gaming venue, there is a need for methods and systems that encourage these social aspects of gaming.

BRIEF SUMMARY

In certain embodiments, the present disclosure relates to a pool management system of a gaming venue. The system can comprise a network communications interface, a processor coupled with the network communications interface, and a memory coupled with and readable by the processor. The memory can store therein a set of instructions which, when executed by the processor, causes the processor to receive, through the network communications interface, an electronic message indicating a request by a first participant to initiate a player pool and generate an electronic record defining the player pool which can comprise the first participant. The instructions can further cause the processor to receive, through the network communications interface, an indication of a contribution amount made by the first participant to the player pool and update the electronic record defining the player pool to increment a player pool amount based on the contribution amount made by the first player. A rule can be defined for the player pool. The rule can define handling of results of gaming activity in which members of the player pool participate and handling of the player pool amount at an occurrence of a predetermined event. The instructions can further cause the processor to receive, through the network communications interface, an electronic message indicating a request by a second participant to participate in the player pool, update the electronic record defining the player pool to indicate addition of the second participant to the player pool, receive, through the network communications interface, an indication of a contribution amount made by the second participant to the player pool, and update the electronic record defining the player pool to increment the player pool amount based on the contribution amount made by the second player. The instructions can then cause the processor to monitor, through the network communications interface, gaming activity of the first participant and the second participant within the gaming venue and update the player pool amount in the electronic record defining the player pool based on monitor the gaming activity of the first participant and the second participant and the rule for the player pool.

According to another embodiment, a pool management system of a gaming venue can comprise a network communications interface, a processor coupled with the network communications interface, and a memory coupled with and readable by the processor, The memory can store therein a set of instructions which, when executed by the processor, causes the processor to maintain a set of player preferences for a user of a mobile device. The instructions can also cause the processor to generate an electronic record defining a player pool and define a rule for the player pool. The rule can define handling of results of gaming activity in which members of the player pool participate and handling of a player pool amount at an occurrence of a predetermined event. The instructions can cause the processor to, based on the set of player preferences and information in the electronic record defining the player pool, send a notification to the mobile device. The notification can indicate existence of the player pool. The instructions can cause the processor to receive, through the network communications interface, an electronic message indicating a request by the user of the mobile device to join the player pool, update the electronic record defining the player pool to indicate addition of the user of the mobile device to the player pool, receive, through the network communications interface, an indication of a contribution amount made by the user of the mobile device to the player pool, and update the electronic record defining the player pool to increment a player pool amount based on the contribution amount made by the user of the mobile device. The instructions can further cause the processor to monitor, through the network communications interface, gaming activity within the gaming venue by the user of the mobile device and update the player pool amount in the electronic record defining the player pool based on monitor the gaming activity of the user of the mobile device and the rule for the player pool.

According to yet another embodiment, a method for managing a player pool in a gaming venue can comprise receiving, by a pool management system, an electronic message indicating a request by a player to initiate a player pool, generating, by the gaming venue system, an electronic record defining the player pool, and determining, by the pool management system, a rule for the player pool. The rule can define handling of results of gaming activity in which player participates and handling of a player pool amount at an occurrence of a predetermined event. The pool management system can receive electronic messages, each message indicating a request by a participant of a plurality of participants to become a member in the player pool, update the electronic record defining the player pool to indicate addition of each participant to the player pool, receive an indication of a contribution amount made by each participant to the player pool, and update the electronic record defining the player pool to increment the player pool amount based on the contribution amount made by each participant. Gaming activity of the player within the gaming venue can then be monitored by the pool management system which can then update the player pool amount in the electronic record defining the player pool based on monitor the gaming activity of the player and the rule defining handling of results of gaming activity in which player participates and handling of the player pool amount at an occurrence of a predetermined event.

Additional features and advantages are described herein and will be apparent from the following Description and the figures.

DETAILED DESCRIPTION

Embodiments of the present disclosure will be described in connection with a managing player pools in which participants contribute an amount to the player pool and share in a result of gaming activities using the player pool amount. For example, a group of players can pool their money and use that pool amount as game play credits at Electronic Gaming Machines (EGMs), Electronic Table Games (ETGs), or other games within a casino or other gaming venue. For each player pool, a rule or set of rules can be defined. The rules can in turn define how the player pool amount is used, how game winnings are returned to the pool or otherwise handled, how a remaining amount of the prize pool, if any, is handled after game play of all participant had finished, etc.

Figure 1:
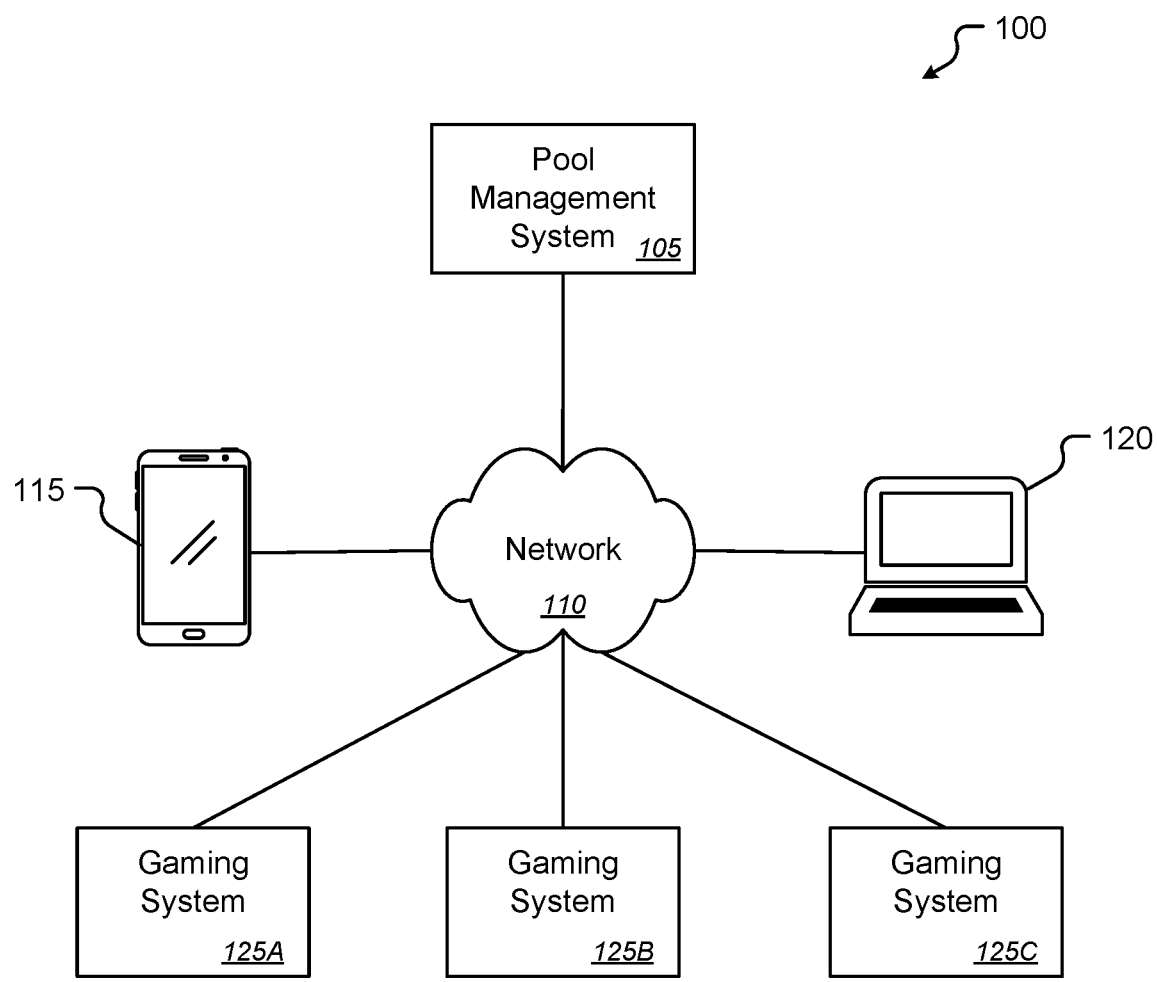
FIG. 1 is a block diagram illustrating an exemplary environment for managing player pools according to one embodiment of the present disclosure.

FIG. 1 is a block diagram illustrating an exemplary environment for managing player pools according to one embodiment of the present disclosure. As illustrated in this example, the environment 100 can comprise a pool management system 105 which can comprise one or more servers and/or other computing devices or systems within a casino or other gaming venue. The pool management system 105 can be communicatively coupled with one or more wired and/or wireless communications networks 110. According to one embodiment, a mobile device 115 such as a cellular phone, tablet, or other portable computing device of a player visiting the casino or other gaming venue can also be communicatively coupled with the pool management system 105 through the communications network 110. As will be described, the player can, through the mobile device 115, request to initiate a player pool, join a player pool, make a contribution to a player pool etc. Additionally, or alternatively, a kiosk system 120 or other computing device or system can also be communicatively coupled with the pool management system 105 through the communications network 110 and can be used by players visiting the casino or other gaming venue to request to initiate a player pool, join a player pool, make a contribution to a player pool etc. In other implementations, a pool may additionally or alternatively be initiated by an administrator, teller, or other staff person of the gaming venue, e.g., through an interface provided by the pool management system 105.

A number of gaming systems 125A-125C can also be communicatively coupled with the communications network 110. These gaming systems 125A-125C can include, but are not limited to, and any of a variety of known Electronic Gaming Machines (EGMs), Electronic Table Games (ETGs), and/or similar gaming systems found in casinos and other gaming venues. Generally speaking, through the mobile device 115 or kiosk system 120, two or more players at one or more casino locations can establish player pools, where one or more players are contributing to the pool, cooperatively playing at one or more gaming systems 12A-125C, and sharing the winnings or yield of playing sessions. For example, one or more players can register in a player pool managed by the pool management system 105 and add funds to the player pool through the kiosk system 120 or a mobile account associated with the mobile device 115 of the player to dedicate a certain amount of money to be played at the location.

The players can also define rules to be applied by the pool management system 105 and defining how the pool amount will be used, e.g., set a ratio of money to be returned to the pool and/or a portion to go be reserved or assigned into an escrow account. In another example, players can set all jackpot wins to enter a shared account to be distributed, with the other players, at the end of the session. In other cases, the players can select or define a rule that all wins over a specified amount, e.g., $100, enter a shared escrow account to be distributed at the end of the session. Similarly, players can select or define a rule that a percentage of all wins, e.g., 50%, enter a shared escrow account to be distributed at the end of the session.

More specifically and as will be described in greater detail below, the participants can request a player pool at a kiosk system 120 or through a mobile device 115 and enter the cash, credit account information, tickets, bills, or some other form of value to be played, either specifically by each participant or in its entirety. Additionally, or alternatively, the pool may be initiated by an administrator, teller, or other staff person of the gaming venue, e.g., through an interface provided by the pool management system 105. If the pool has already been created in the pool management system 105, the participant can join the pool through a mobile device 115 or kiosk system 120 by entering a code identifying the pool or scanning a ticket to enter the pool and can insert the amount of money to be contributed to the pool through the kiosk system 120 or transfer the amount from a mobile wallet through the mobile device 115. Once the player pool has been created, joined, and funded by the participants, the pool can be used for game play credit at the various gaming systems 125A-125C. For example, the player or players can register at a gaming system 125A-125C to be played by entering a code identifying the player pool. In some cases, additional players may join the pool one in progress, e.g., in response to an invitation from one of the current players, based on a request from the joining player identifying the pool to be joined, etc. The gaming systems 125A-125C can monitor the gaming activities of the participants and the pool management system 105 can apply the rules selected or defined for the pool to manage how the pool amount is used, how winnings are applied or managed, etc. Upon completion of gaming by all pool participants, or a predetermined period of time, the gaming system 125A-125C or a cashier can dispense a cashout ticket with a report of disbursement of the remaining pool amount, if applicable. In some cases, one or more players may decide to leave the pool even before completion of gaming or the expiration of the time period. In such cases, the pool amount may be distributed on a pro-rated based, e.g., based on time, game play activity, etc., or in another manner as may be defined in a rule for such situations.

For example, a married couple may go to a casino or gaming venue and enter a player pool with a predetermined shared budget. When the funds are exhausted, both participants can return to a cashier and review their win/loss status. They can then choose to re-establish a new pool or cash out what is remaining. In another example, a large group of players on a trip can join a set pool. Each player may be allowed to play a predefined amount from the player pool with each win over a certain dollar amount being returned to the player pool or reserved in a related escrow account, and/or winning amounts can be split up between the player pool amount and an escrow account. At the end of the game play, the participants can split the remaining funds, if any, in the player pool and/or escrow account.

In yet another example, a large group of people can enter and finance a pool where a representative plays a casino game with a large progressive and if the jackpot is won, it has all participants registered for their portion of the prize. In this example, a group of people, e.g., at a workplace, know that an individual, such as a co-work, is going on a trip to a casino or other gaming venue. Everyone in the group can download a group play application to enroll in the group and contribute to a player pool to be used at the casino or other gaming venue. When representative player arrives, he can use those funds to play game, e.g., an EGM or other gaming system 125A-125C with a high top award jackpot. If he wins, everyone who contributed to the player pool can receive a portion percentage equal to the amount they contributed.

According to one embodiment, the pool management system 105 can promote player pools by offering system generated bonus events, extra contests, and consolidation prizes if the results are under a location set threshold. In another embodiment, the pool management system 105 can push player pool offers to the mobile device 115 of one or more players when the mobile device is executing a mobile app for the casino or gaming venue. In this example, potential player pool participants can be sent player pool entry opportunities, based on game play, demographic, interests, etc., through the property's mobile app. For example, a notification displays that offers the player additional game play monies if they enter a certain played pool. The potential participant can then click "Join", for example, and can be prompted to enter an amount, which can be deducted from the participant's account, e.g., a pre-funded account with the casino or gaming venue or a mobile wallet account associated with the participant's mobile device. Potential participants can also opt-in or opt-out of receiving notifications for player pools that interest them.

Figure 2:
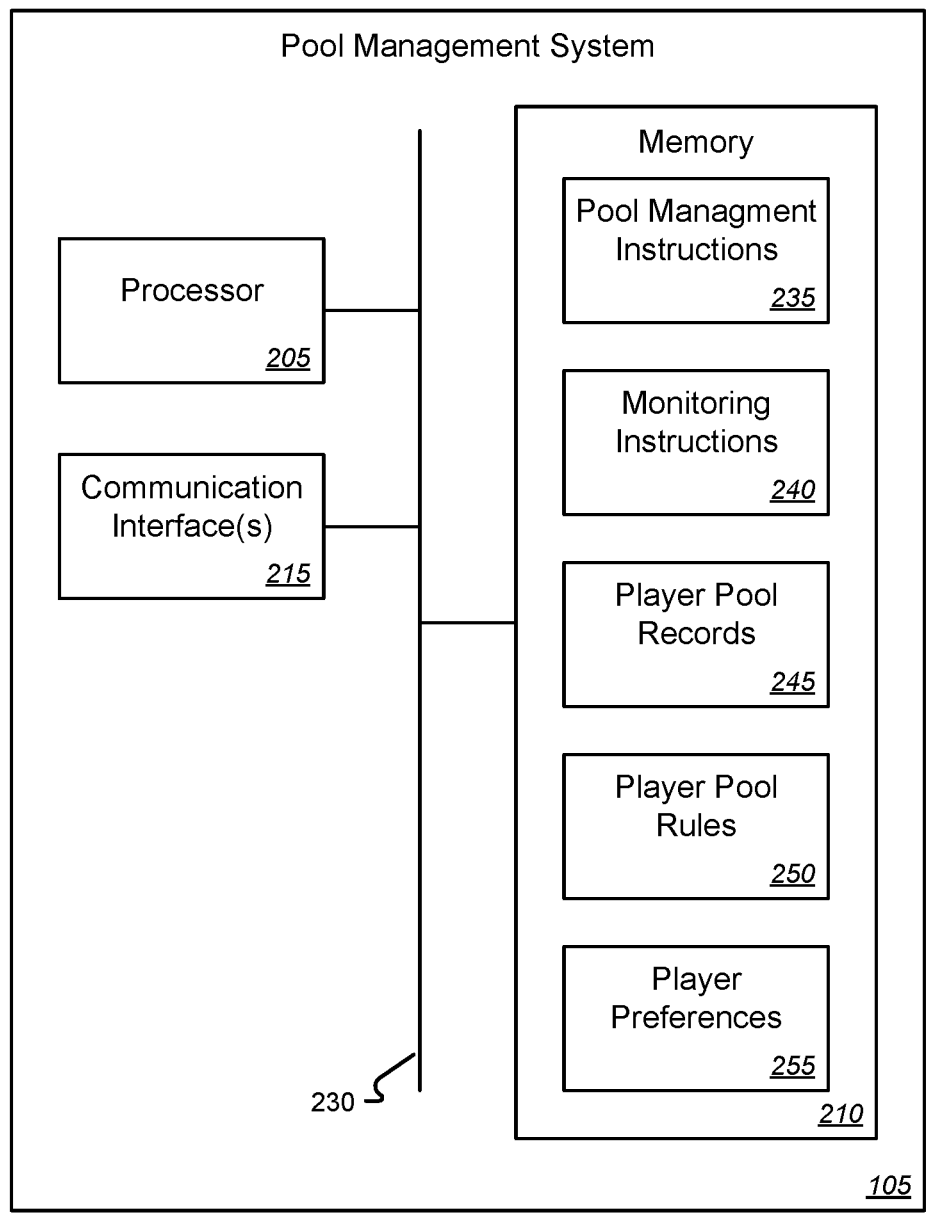
FIG. 2 is a block diagram illustrating additional details of an exemplary pool management system according to one embodiment of the present disclosure.

FIG. 2 is a block diagram illustrating additional details of an exemplary pool management system according to one embodiment of the present disclosure. As illustrated in this example, a pool management system 105 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the pool management system 105 as described herein.

The memory 210 can be coupled with and readable by the processor 205 via a communications bus 230. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communication interfaces 215 via the communications bus 230. The communication interfaces 215 can comprise, for example, a Bluetooth, WiFi, cellular, and/or other type of wireless communications interface.

The memory 210 can store therein sets of instructions which, when executed by the processor 205, cause the processor 205 to manage player pools as described herein. For example, the memory 210 can store a set of pool management instructions 235 which, when executed by the processor 205, can cause the processor 205 to generate or define a player pool, e.g., upon receiving a request from a mobile device 115, kiosk system 120, or other computing device or system.

As will be described in greater detail below, the pool management instructions 235, when generating and managing player pools, can define a set of one or more player pool records 245 for each pool. Generally speaking, these records 245 can identify the pool by name, number, code, or other unique identifier, can identify participants in each pool by name, alias, of otherwise, can include indications of an amount of that each participant contributed to the player pool as well as the current total amount of the pool, etc.

As will also be described in greater detail below, the pool management instructions 235, when generating and managing player pools, can define a set of one or more player pool rules 250 for each pool. Generally speaking, these rules 250 can define how the player pool is managed, i.e., how the player pool amount can be used, how game winnings are handled relative to the player pool, how the remaining player pool amount, if any, is distributed or returned to the participants at the end of game play by all participants in the pool or at a designated time, etc.

The memory 210 can also store a set of monitoring instructions 240 which, when executed by the processor 205, can cause the processor 205 to monitor game play activity of each participant in a player pool. For example, when starting a game at an EGM or ETG, each participant can identify the player pool by name, number, code, or other unique identifier, e.g., by scanning a card, QR code presented on a mobile device, etc. The monitoring instructions 240 can cause the processor 205 to receive this identifier through he communication interface 215 and monitor gaming activity of the participant, e.g., the bets placed by the participant and the results of the game can then be recorded. The pool management instructions 235 can then cause the processor 205 to apply the player pool rules 250 to relevant activities, e.g., debit the player pool amount indicated in the player pool records 245 for bets placed, credit the player pool amount indicated in the player pool records 245 for winning amounts etc.

According to one embodiment, the memory 210 can also store therein a set of player preferences for one or more players who are potential player pool participants. Generally speaking, these preferences may be predefined by the user or player or can be generated and/or updated based on detected gaming activities of the user or player in the gaming venue, e.g., a preferred game or game type etc. The pool management instructions 235, when executed by the processor 205, can cause the processor 205 to read the player preferences 255 and the player pool records 245 and provide, through the communication interfaces 215, notifications to one or more potential player pool participants of the existence of player pools that those potential participants may be interested in based on their preferences. Additional details of the processes performed by the processor 205 of the pool management system 105 when executing the pool management instructions 235 and monitoring instructions 240 according to various embodiments will be described in greater detail below with reference to FIGS. 6-8.

Figure 3:
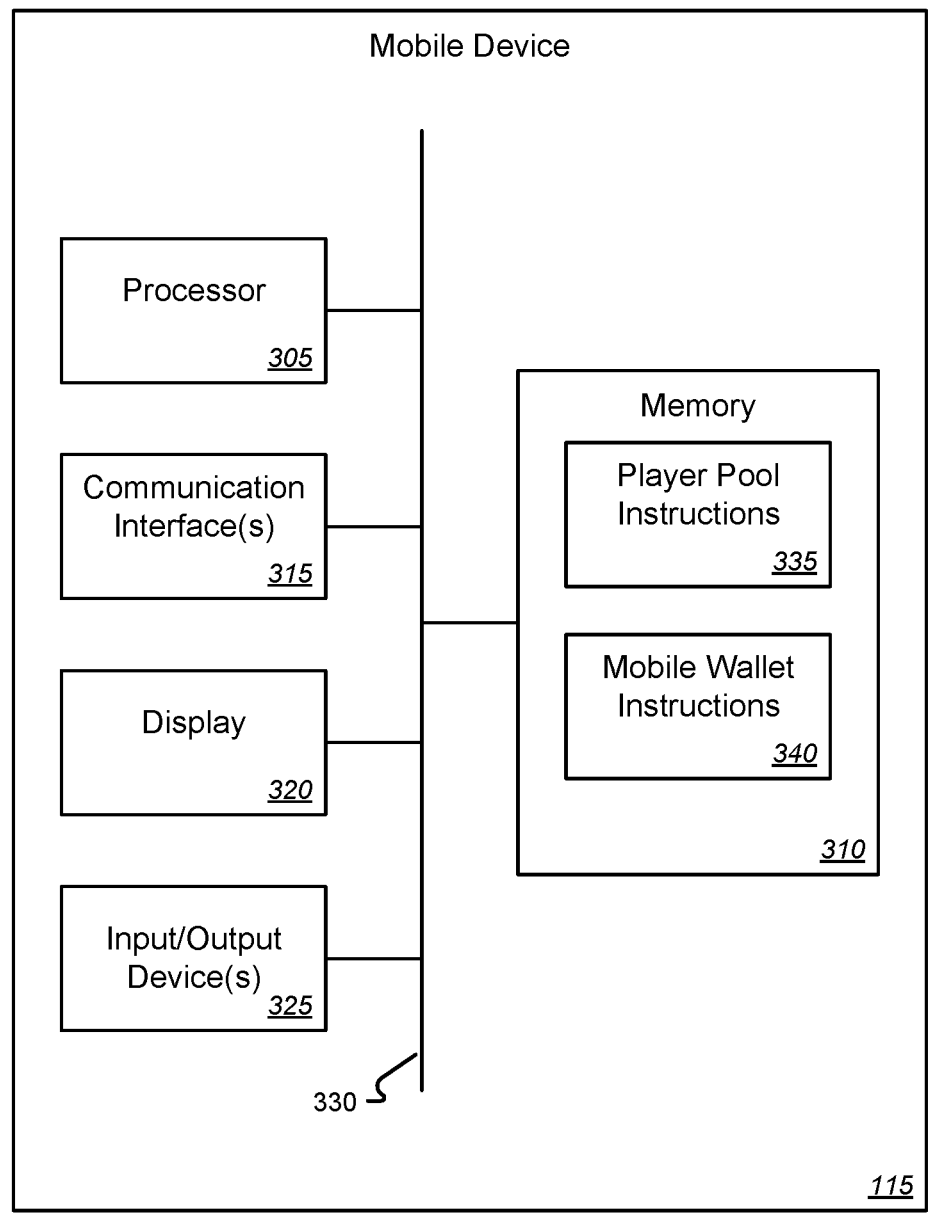
FIG. 3 is a block diagram illustrating additional details of an exemplary mobile device according to one embodiment of the present disclosure.

FIG. 3 is a block diagram illustrating additional details of an exemplary mobile device according to one embodiment of the present disclosure. As illustrated in this example, the mobile device 115 can comprise a processor 305 such as any of the various types of processors described above. A memory 310 can be coupled with and readable by the processor 305 via a communications bus 330. The memory 310 can comprises any one or more of the different types of volatile and/or non-volatile memories described above. The processor 305 can also be coupled with one or more communication interfaces 315, a display 320, and one or more input/output devices 325 via the communications bus 330. The communication interfaces 315 can comprise, for example, a cellular, Bluetooth, WiFi, and/or other type of wireless communications interface. The display 320 can comprise, for example, a Liquid Crystal Display (LCD), Light Emitting Diode (LED), Organic Light Emitting Diode (OLED), display or other type of display for presenting images and other graphics and can be touch sensitive allowing the user to use the display 320 as an input device as well. The input/output devices 325 can include, but are not limited to, one or more of a speaker, a numeric and/or alphanumeric keypad, a touch pad, one or more buttons or switches, etc.

The memory 310 can store therein sets of instructions which, when executed by the processor 305, cause the processor 305 to interact with the pool management system 105 to allow the user of the mobile device 115 to participate in a player pool. More specifically, the memory 310 can store a set of player pool instructions 335 that can, when executed by the processor 305, cause the processor 305 to send and receive messages, though the communication interface 315, to and from the pool management system 105 to allow the user of the mobile device to request initiation of a player pool, request to join an identified player pool, e.g., after receiving an identifier for that pool such as a name, code, QR code, or other unique identifier, and/or after receiving a notification of an existing player pool from the pool management system.

According to one embodiment, the memory 310 can also store a set of mobile wallet instructions 340 that, when executed by the processor 305 and together with the player pool instructions, can cause the processor 305 to initiate a transfer of funds from an account associated with a user of the mobile device to an account associated with the player pool. In this way, the user of the mobile device 115 can use a pre-funded mobile wallet account to make contributions to the player pool.

Figure 4:
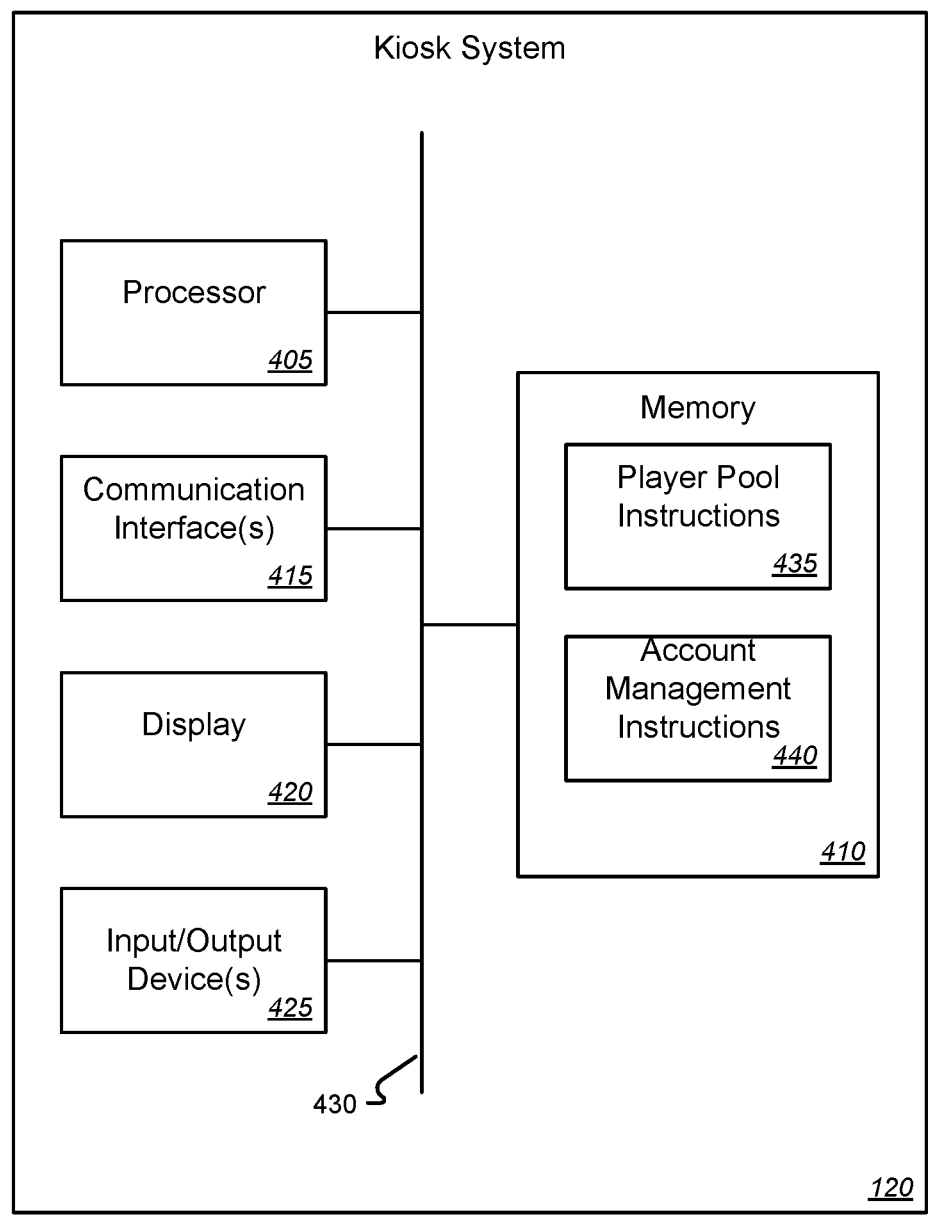
FIG. 4 is a block diagram illustrating additional details of an exemplary kiosk system according to one embodiment of the present disclosure.

FIG. 4 is a block diagram illustrating additional details of an exemplary kiosk system according to one embodiment of the present disclosure. As illustrated in this example, the kiosk system 120 can comprise a processor 405 such as any of the various types of processors described above. A memory 410 can be coupled with and readable by the processor 405 via a communications bus 430. The memory 410 can comprises any one or more of the different types of volatile and/or non-volatile memories described above. The processor 405 can also be coupled with one or more communication interfaces 415, a display 420, and one or more input/output devices 425 via the communications bus 430. The communication interfaces 415 can comprise, for example, a Bluetooth, WiFi, cellular, and/or other type of wireless communications interface. The display 320 can comprise, for example, a Liquid Crystal Display (LCD), Light Emitting Diode (LED), Organic Light Emitting Diode (OLED), display or other type of display for presenting images and other graphics and can be touch sensitive allowing the user to use the display 420 as an input device as well. The input/output devices 425 can include, but are not limited to, one or more of a speaker, a numeric and/or alphanumeric keypad, a touch pad, one or more buttons or switches, etc.

The memory 410 can store therein sets of instructions which, when executed by the processor 405, cause the processor 405 to interact with the pool management system 105 to allow the user of the kiosk system 120 to participate in a player pool. More specifically, the memory 410 can store a set of player pool instructions 435 that can, when executed by the processor 405, cause the processor 405 to send and receive messages, though the communication interface 415, to and from the pool management system 105 to allow the user of the kiosk system 120 to request initiation of a player pool, request to join an identified player pool, e.g., after receiving an identifier for that pool such as a name, code, QR code, or other unique identifier, and/or after receiving a notification of an existing player pool from the pool management system.

According to one embodiment, the memory 410 can also store a set of account management instructions 440 that, when executed by the processor 405 and together with the player pool instructions 435, can cause the processor 405 to initiate a transfer of funds from an account associated with a user of the kiosk system 120, such as a credit card account or pre-fund account with the gaming venue, to an account associated with the player pool. In this way, the user of the kiosk system 120 can make contributions to the player pool.

Figure 5:
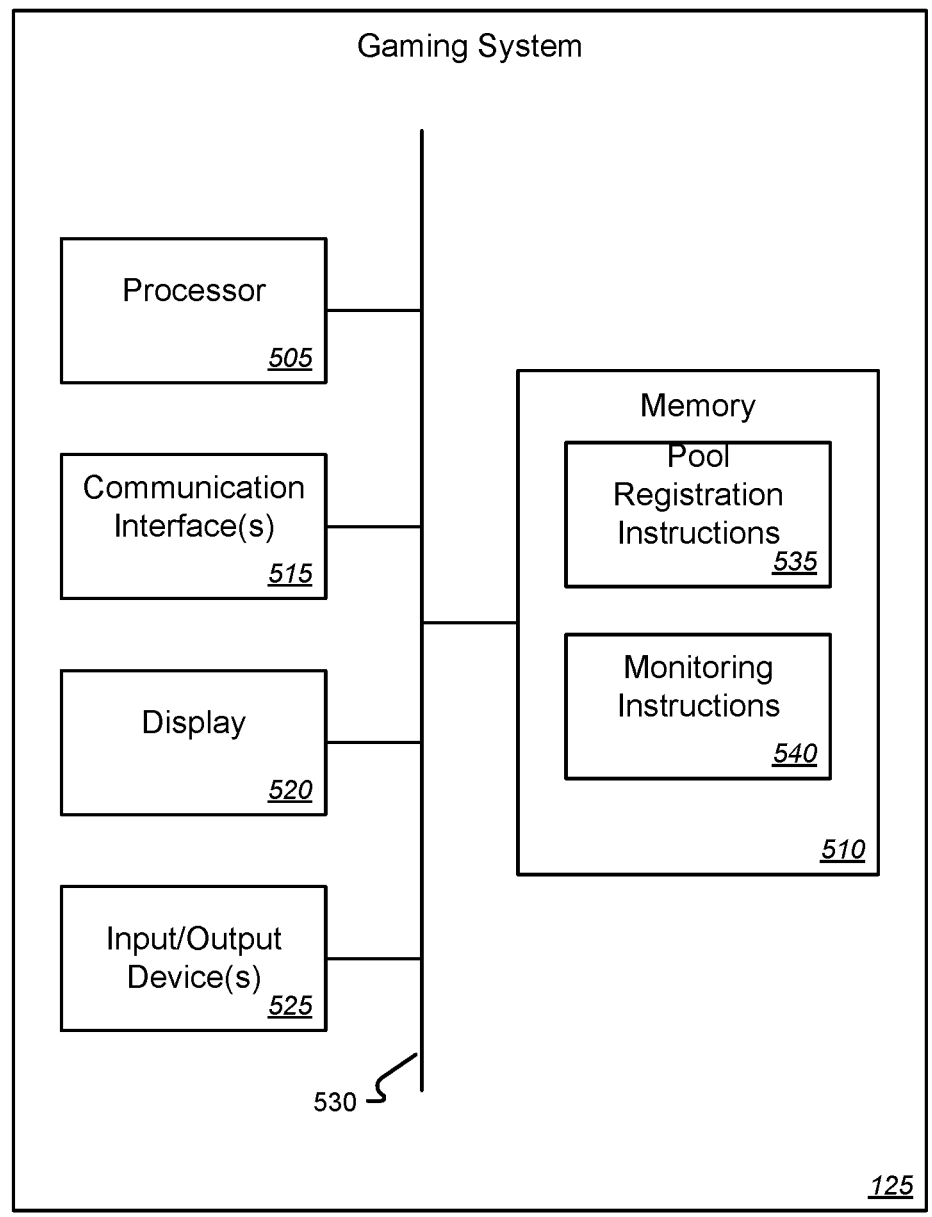
FIG. 5 is a block diagram illustrating additional details of an exemplary gaming system according to one embodiment of the present disclosure.

FIG. 5 is a block diagram illustrating additional details of an exemplary gaming system according to one embodiment of the present disclosure. As illustrated in this example, the gaming system 125 can comprise a processor 505 such as any of the various types of processors described above. A memory 510 can be coupled with and readable by the processor 505 via a communications bus 530. The memory 510 can comprises any one or more of the different types of volatile and/or non-volatile memories described above. The processor 505 can also be coupled with one or more communication interfaces 515, a display 520, and one or more input/output devices 525 via the communications bus 530. The communication interfaces 515 can comprise, for example, a Bluetooth, WiFi, cellular, and/or other type of wireless communications interface. The display 520 can comprise, for example, a Liquid Crystal Display (LCD), Light Emitting Diode (LED), Organic Light Emitting Diode (OLED), display or other type of display for presenting images and other graphics during game play and can be touch sensitive allowing the user to use the display 520 as an input device as well. The input/output devices 525 can include, but are not limited to, one or more of a speaker, a numeric and/or alphanumeric keypad, a touch pad, one or more buttons or switches, etc.

The memory 510 can store therein sets of instructions which, when executed by the processor 505, cause the processor 505 to interact with the pool management system 105 to allow the user of the gaming system 125 to participate in a player pool. More specifically, the memory 510 can store a set of player pool registration instructions 535 that can, when executed by the processor 505, cause the processor 505 to receive an indication of a player pool from a player or user of the gaming system 125, e.g., through on of the input devices 525. For example, when a player pool participant approaches the gaming system, the participant can, through touching the display 520 or using another input device 525, indicate a desire to join a player pool. In response, the pool registration instructions 535 can cause the processor 505 to identify the desired pool, e.g., by reading a QR code from a ticket or display of a mobile device of the participant, receiving input through touch on the display 520, or through another input device 525, and send that identifying information through the communication interface 515 to the pool management system 105 to allow the participant to join and participate in the pool. In response, the processor 505 can, in some cases, receive from the pool management system 105 through the communications interfaces 515 an indication of a current player pool amount for the identified player pool or an indication of a portion of the player pool amount available to the participant as game play credit. The pool registration instructions 535 can cause the processor 505 to present, e.g., through the display 520, an indication of this amount to the participant.

The memory 510 can also store a set of monitoring instructions 540 that, when executed by the processor 505, can cause the processor 505 to monitor game play activities of the participant. For example, the monitoring instructions 540 can cause the processor to monitor bets placed by the participant and results of those bets, i.e., wins or losses, and report those activities through the communications interface 515 to the pool management system 105 to update the player pool amount accordingly. In response, the processor 505 can, in some cases, receive from the pool management system 105 through the communications interfaces 515 an indication of an updated player pool amount or portion of the player pool amount available to the participant as game play credit. The pool registration instructions 535 can cause the processor 505 to present, e.g., through the display 520, an indication of this amount to the participant.

Figure 6:
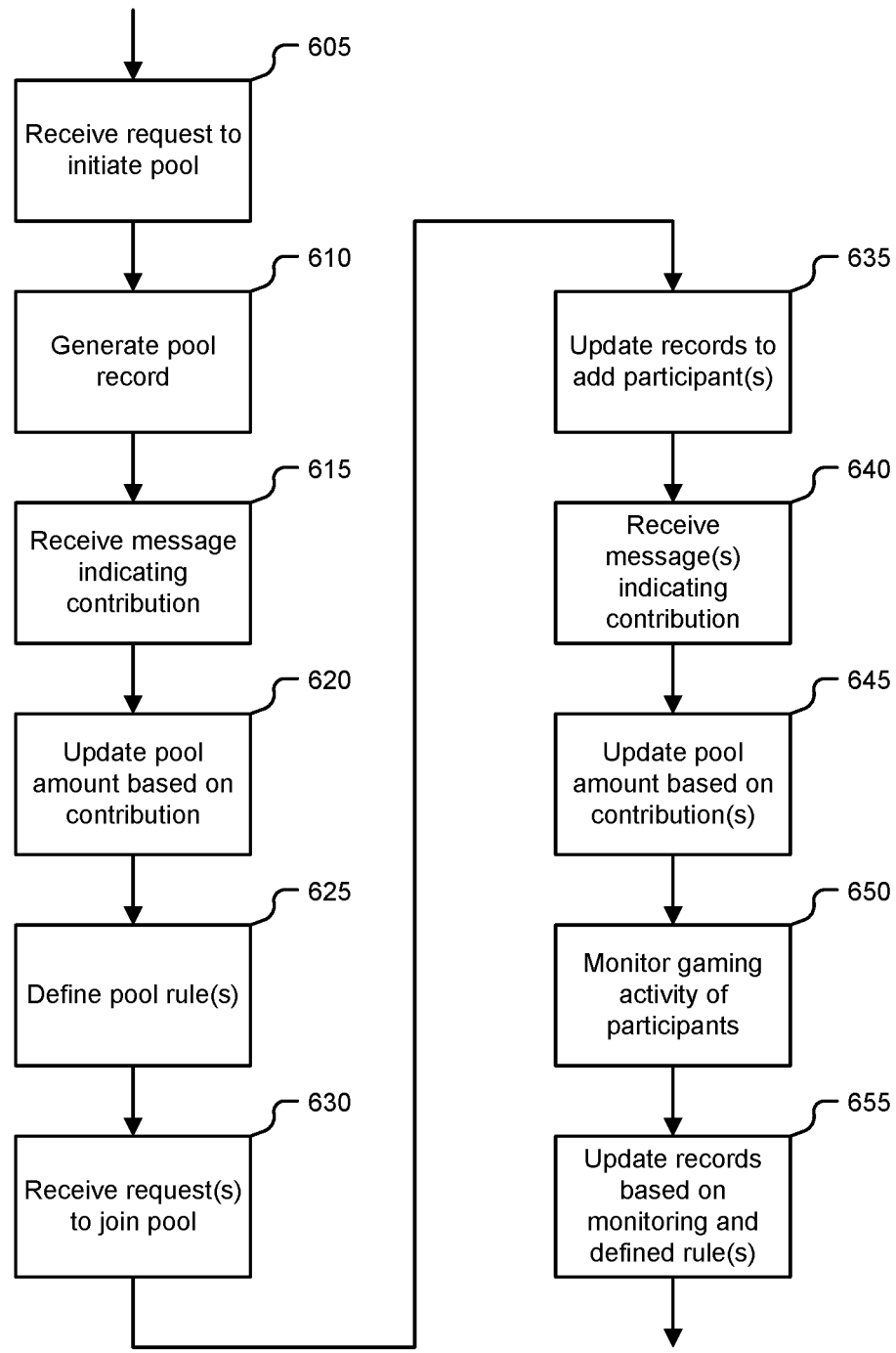
FIG. 6 is a flowchart illustrating an exemplary process for managing a player pool according to one embodiment of the present disclosure.

FIG. 6 is a flowchart illustrating an exemplary process for managing a player pool according to one embodiment of the present disclosure. In this example, multiple players participate in the player pool with each player contributing to the player pool and potentially benefiting from results of gaming activities of one or more other players of the player pool. As illustrated here, managing a player pool in a gaming venue can comprise receiving 605, by a pool management system 105 as described above, an electronic message indicating a request initiate a player pool. This message can be received from a mobile device 115, a kiosk system 120, or other computing device or system and can be generated in response to an initial, first participant or organizer of the pool requesting that the pool be established.

In response to and based on this request, an electronic record 245 defining the player pool can be generated 810. The record 245 defining the player pool can comprise data identifying the pool by name, number, code, or other unique identifier, identifying participants by name, alias, of otherwise, indications of an amount of that participants contribution to the player pool and a total amount of the pool, etc.

An indication of a contribution amount made by the first participant to the player pool can also be received, e.g., as part of the message indicating the request to initiate the player pool or in a separate message from the mobile device 115, kiosk system 120 or other computing device or system. The electronic record 245 defining the player pool can then be updated to increment a player pool amount based on the contribution amount made by the first player A rule for the player pool can also be defined 625. The rule for the player pool can define handling of results of gaming activity in which player participates and handling of the player pool amount or total at an occurrence of a predetermined event, e.g., how the player pool amount can be used by the player, how the pool amount can be updated based on the players activities, e.g., winnings, how the pool amount can be distributed back to the participants at various times and/or at a conclusion of the pool, etc. Defining 625 this rule can comprise selecting a predefined rule, modifying a predefined rule, or selecting options or otherwise generating a new rule, e.g., by the initiator through mobile device 115, kiosk system 120, or other computing device or system used to originate the request to initiate the player pool.

Once the pool has been initiated, electronic messages can be received 630 from one or more additional participants. Each message can indicate a request by the participant to become a member in the player pool. The message can identify the player pool, e.g., by name, number, code, or other unique identifier and can also identify the requesting participant, e.g., by name, alias, etc. The electronic record 245 defining the player pool can be updated 635 to indicate addition of each participant to the player pool. An indication of a contribution amount made by each participant to the player pool can also be received 640, e.g., in the message requesting participation, in another message originated by the participant through a mobile device 115, kiosk system 120, or other computing device or system, etc. For example, the contribution amount made by a user of a mobile device to the player pool can be funded by and deducted from a mobile wallet account associated with the user of the mobile device. In any of these or other cases, the electronic record 245 defining the player pool can be updated 645 to increment the player pool amount based on the contribution amount made by each participant.

Once the participants join the pool, each participant may then proceed to play various games in the gaming venue and the player pool amount can be made available to the participants as game player credit within the gaming venue. The gaming activity of each participant can then be monitored 650. For example, when starting a game at an EGM or ETG, each participant can identify the player pool by name, number, code, or other unique identifier, e.g., by scanning a card, QR code presented on a mobile device, etc. Once the participant joins a pool, that information can be associated with a participant account such that when the participant moves between EGMs, the system knows the participant is in a pool. The participant account could be activated by a player loyalty card or by logging into the player loyalty system using a username and password. The pool information could also be stored on the mobile device of the participant such that when the participant goes to each EGM, the participant uses the mobile device to "log into" each EGM and then the EGM knows the participant is in a pool and knows the associated information.

The bets placed by the participant and the results of the game can then be recorded. The player pool amount in the electronic record 245 defining the player pool can then be updated 655 based on monitor the gaming activity of the player, e.g., debits made for bets placed, credits made for winnings, etc., and the rule defining handling of results of gaming activity in which player participates and handling of the player pool amount at an occurrence of a predetermined event. The predetermined event can comprise an outcome a game detected while monitoring gaming activity of the player and the rule for the player pool can define a distribution of a prize amount of the game.

The predetermined event can comprise an outcome of a game detected while monitoring gaming activity of the participants and the rule for the player pool can define a distribution for the prize amount won and/or distribution of a final player pool amount, if any, at the end of play by all, after the expiration of a certain amount of time or at a certain time and day as may be selected and defined in the rule(s). For example, the rule may define an even distribution of a prize amount of the game between the participants. In another example, the rule for the player pool can define that a prize amount of the game over a predetermined amount is credited to the player pool amount to be made available to participants for additional game play. In yet another example, the rule for the player pool can define that a predefined percentage of a prize amount of the game is credited to the player pool amount to be made available to participants for additional game play. In some cases, the rule can define the distribution based on a percentage of the player pool amount contributed by each of the plurality of participants, i.e., any distributions from the pool, including the amount available for use as game play credit, can be proportional to the amount contributed. In other cases, the distribution of the prize amount can be based on a game play amount of each of the plurality of participants, i.e., those who play more receive a bigger share.

Figure 7:
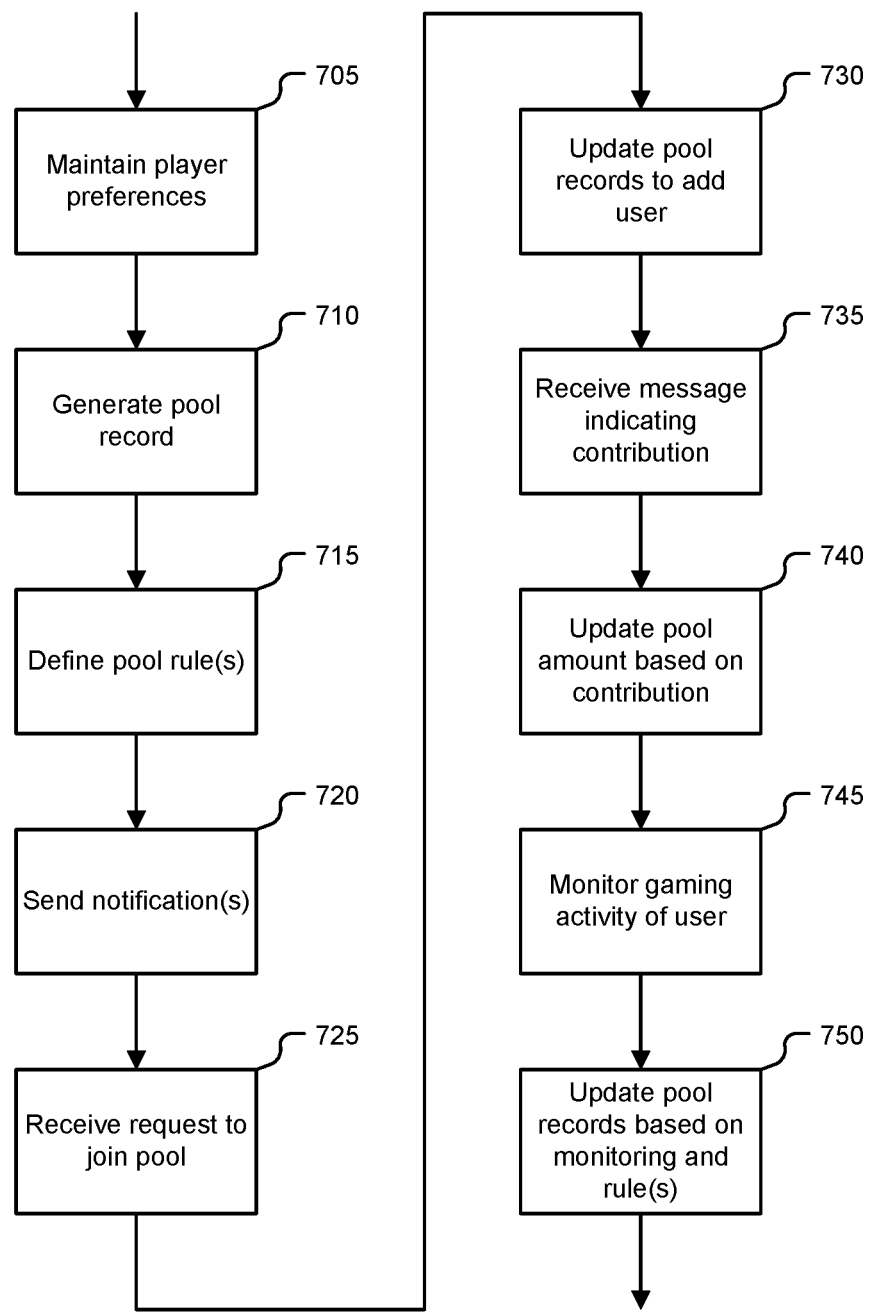
FIG. 7 is a flowchart illustrating an exemplary process for managing a player pool according to an alternative embodiment of the present disclosure.

FIG. 7 is a flowchart illustrating an exemplary process for managing a player pool according to an alternative embodiment of the present disclosure. In this example, a player pool is generated and notifications of the existence of the player pool are provided to certain players within the gaming venue based on known preferences for those players. As illustrated here, managing a player pool in a gaming venue can comprise maintaining 705 a set of player preferences for a user of a mobile device 115 or other player. These preferences may be predefined by the user or player or can be generated and/or updated based on detected gaming activities of the user or player in the gaming venue, e.g., a preferred game or game type etc.

A player pool can be initiated in response to a request from a player similar to that described above or may be initiated by an administrator or other staff of the gaming venue. In response, an electronic record 245 defining the player pool can be generated 710. The record 245 defining the player pool can comprise data identifying the pool by name, number, code, or other unique identifier, identifying participants by name, alias, of otherwise, indications of an amount of that participants contribution to the player pool and a total amount of the pool, etc.

Similar to the example described above with reference to FIG. 6, a rule can be defined 715 for the player pool. The rule can define handling of results of gaming activity in which members of the player pool participate and handling of a player pool amount at an occurrence of a predetermined event. For example, the predetermined event can comprise an outcome of a game detected while monitoring gaming activity of participants in the player pool and the rule for the player pool can define a distribution for the prize amount won and/or distribution of a final player pool amount, if any, at the end of play by all, after the expiration of a certain amount of time or at a certain time and day as may be selected and defined in the rule(s). The rule may define an even distribution of a prize amount of the game between the participants, can define that a prize amount of the game over a predetermined amount is credited to the player pool amount to be made available to participants for additional game play, can define that a predefined percentage of a prize amount of the game is credited to the player pool amount to be made available to participants for additional game play, can define the distribution based on a percentage of the player pool amount contributed by each of the plurality of participants, can be define a distribution proportional to the amount contributed or based on a game play amount of each of the participants, etc.

Based on the set of player preferences and information in the electronic record 245 defining the player pool, a notification can be sent 720 to the mobile device 115 of the user or player. The notification can indicate existence of the player pool. In some cases, the notification indicating existence of the player pool can further comprise an indication of an incentive to join the player pool. Additionally, or alternatively, the notification indicating existence of the player pool can be sent to the user based on the set of player preferences indicating that the user of the mobile device 115 has opted into receiving notification of available player pools.

In response to the notification, an electronic message can be received 725 from the mobile device 115. The message can indicate a request by the user of the mobile device 115 to become a member in the player pool. The message can identify the player pool, e.g., by name, number, code, or other unique identifier and can also identify the requesting participant, e.g., by name, alias, etc. The electronic record 245 defining the player pool can be updated 730 to indicate addition of the user of the mobile device 115 to the player pool. An indication of a contribution amount made by the user of the mobile device 115 to the player pool can also be received 735, e.g., in the message requesting participation, in another message originated by the user through the mobile device 115, kiosk system 120, or other computing device or system, etc. For example, the contribution amount made by the user of the mobile device 115 to the player pool can be funded by and deducted from a mobile wallet account associated with the user of the mobile device 115. In any of these or other cases, the electronic record 245 defining the player pool can be updated 740 to increment the player pool amount based on the contribution amount made by each participant.

Once the user of the mobile device 115 joins the pool, the user may then proceed to play various games in the gaming venue and some or all of the player pool amount can be made available to the as game player credit within the gaming venue depending upon the defined rule. The gaming activity of the user of the mobile device 115 can then be monitored 745. For example, when starting a game at an EGM or ETG, the user can identify the player pool by name, number, code, or other unique identifier, e.g., by scanning a card, QR code presented on the mobile device 115, etc. The bets placed by the user of the mobile device 115 and the results of the game can then be recorded. The player pool amount in the electronic record 245 defining the player pool can then be updated 750 based on monitor the gaming activity of the user of the mobile device 115, e.g., debits made for bets placed, credits made for winnings, etc., and the rule defining handling of results of gaming activity in which user participates and handling of the player pool amount at an occurrence of a predetermined event, e.g., an outcome a game detected while monitoring gaming activity of the player, and the rule for the player pool can define a distribution of a prize amount of the game as in any of the examples described above.

Figure 8:
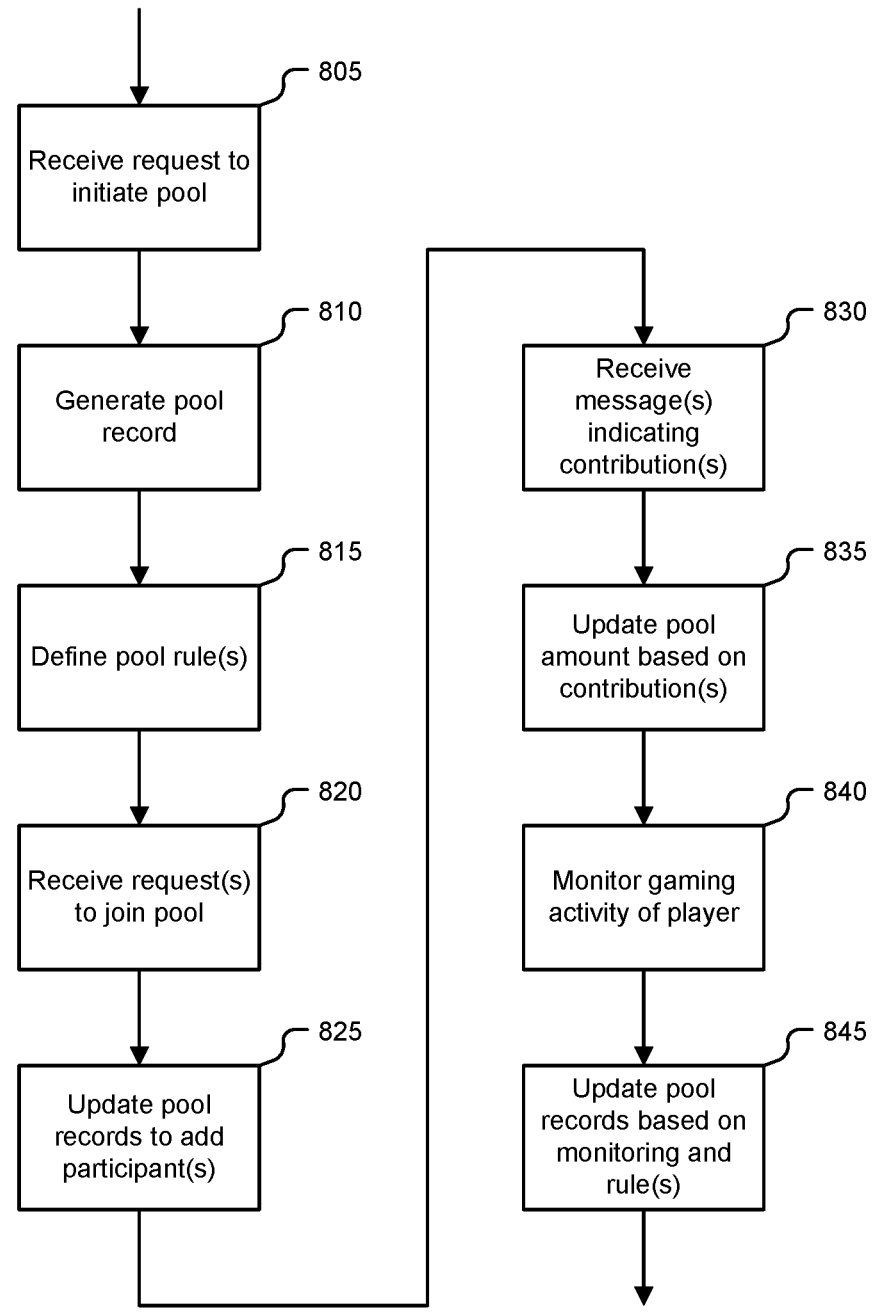
FIG. 8 is a flowchart illustrating an exemplary process for managing a player pool according to another alternative embodiment of the present disclosure.

FIG. 8 is a flowchart illustrating an exemplary process for managing a player pool according to another alternative embodiment of the present disclosure. In this example, multiple participants contribute to a player pool associated with a single player with the participants potentially benefiting from gaming activity of the player. As illustrated here, managing a player pool in a gaming venue can comprise receiving 805, by a pool management system, an electronic message indicating a request by a player to initiate a player pool. As in previous examples, this message can be received from a mobile device 115, a kiosk system 120, or other computing device or system.

In response to and based on this request, an electronic record 245 defining the player pool can be generated 810 and a rule for the player pool can be defined 815. As described above, the record 245 defining the player pool can comprise data identifying each participant, an amount of that participants contribution to the player pool, etc. Also as described above, the rule for the player pool can define handling of results of gaming activity in which player participates and handling of a player pool amount at an occurrence of a predetermined event, e.g., how the player pool amount can be used by the player, how the pool amount can be updated based on the players activities, e.g., winnings, how the pool amount can be distributed back to the participants at various times and/or at a conclusion of the pool, etc. Defining 815 this rule, again as described above, can comprise selecting a predefined rule, modifying a predefined rule, or selecting options or otherwise generating a new rule, e.g., by the player through mobile device 115, kiosk system 120, or other computing device or system used to originate the request to initiate the player pool.

Once the pool has been initiated, electronic messages can be received 820 from one or more participants. Each message can indicate a request by the participant to become a member in the player pool. As noted above, the message can identify the player pool, e.g., by name, number, code, or other unique identifier and can also identify the requesting participant, e.g., by name, alias, etc. The electronic record 245 defining the player pool can be updated 825 to indicate addition of each participant to the player pool. An indication of a contribution amount made by each participant to the player pool can also be received 830, e.g., in the message requesting participation, in another message originated by the participant through a mobile device 115, kiosk system 120, or other computing device or system, etc. In any of these or other cases, the electronic record 245 defining the player pool can be updated 835 to increment the player pool amount based on the contribution amount made by each participant.

Gaming activity of the player within the gaming venue can then be monitored 840. For example, when starting a game at an EGM or ETG, the player can identify the player pool by name, number, code, or other unique identifier, e.g., by scanning a card, QR code presented on a mobile device, etc. The bets placed the player and the results of the game can then be recorded. The player pool amount in the electronic record 245 defining the player pool can then be updated 845 based on monitor the gaming activity of the player, e.g., debits made for bets placed, credits made for winnings, etc., and the rule defining handling of results of gaming activity in which player participates and handling of the player pool amount at an occurrence of a predetermined event. The predetermined event can comprise an outcome a game detected while monitoring gaming activity of the player and the rule for the player pool can define a distribution of a prize amount of the game. For example, the rule for the player pool can define distribution of the prize amount of the game based on a contribution of each participant to the player pool amount, i.e., the payout can be proportional to the contribution. In some cases, the rule for the player pool can additionally or alternatively, define distribution of the prize amount of the game between each participant and the player, i.e., the player may share in the winnings. Other rules including, but not limited to, those described in the examples above may be additionally or alternatively defined depending upon the exact implementation.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A pool management system of a gaming venue, the system comprising:
   a network communications interface;
   a processor coupled with the network communications interface; and
   a memory coupled with and readable by the processor and storing therein a set of instructions which, when executed by the processor, causes the processor to:
     receive, through the network communications interface, an electronic message indicating a request by a first participant to initiate a player pool;
     generate an electronic record defining the player pool, the player pool comprising the first participant;
     receive, through the network communications interface, an indication of a contribution amount made by the first participant to the player pool;
     update the electronic record defining the player pool to increment a player pool amount based on the contribution amount made by the first player;
     define a rule for the player pool, the rule defining handling of results of gaming activity in which members of the player pool participate and handling of the player pool amount at an occurrence of a predetermined event;
     receive, through the network communications interface, an electronic message indicating a request by a second participant to participate in the player pool;
     update the electronic record defining the player pool to indicate addition of the second participant to the player pool;
     receive, through the network communications interface, an indication of a contribution amount made by the second participant to the player pool;
     update the electronic record defining the player pool to increment the player pool amount based on the contribution amount made by the second player;
     monitor, through the network communications interface, gaming activity of the first participant and the second participant within the gaming venue; and
     update the player pool amount in the electronic record defining the player pool based on monitoring the gaming activity of the first participant and the second participant and the rule for the player pool, wherein the set of instructions to update the player pool amount in the electronic record defining the player pool based on monitoring the gaming activity of the first participant and the second participant and the rule for the player pool comprises a set of instructions to:
       based on detection of a win of a first amount in the gaming activity of the first participant, determine whether the first amount satisfies the rule for the player pool; and
       based on a determination that the first amount does not satisfy the rule, award the first amount to the first participant instead of the player pool.

2. The pool management system of claim 1, wherein the electronic message indicating the request by the second participant to participate in the player pool is received from a kiosk device within the gaming venue.

3. The pool management system of claim 1, wherein the electronic message indicating the request by the second participant to participate in the player pool is received from a mobile device of the second participant.

4. The pool management system of claim 1, wherein the predetermined event comprises an outcome a game detected while monitoring the gaming activity of the first participant and the second participant and wherein the rule for the player pool defines an even distribution of a prize amount of the game between the first participant and the second participant.

5. The pool management system of claim 1, wherein the predetermined event comprises an outcome a game detected while monitoring the gaming activity of the first participant and the second participant and wherein the rule for the player pool defines that a prize amount of the game over a predetermined amount is credited to the player pool amount.

6. The pool management system of claim 1, wherein the predetermined event comprises an outcome a game detected while monitoring the gaming activity of the first participant and the second participant and wherein the rule for the player pool defines that a predefined percentage of a prize amount of the game is credited to the player pool amount.

7. The pool management system of claim 1, wherein the set of instructions to update the player pool amount in the electronic record defining the player pool based on monitoring the gaming activity of the first participant and the second participant and the rule for the player pool further comprises a set of instructions to, based on a determination that the first amount does satisfy the rule, update the player pool amount with the first amount.

8. The pool management system of claim 1, wherein the rule for the player pool indicates that only win amounts above a threshold are awarded to the player pool.

9. A pool management system of a gaming venue, the system comprising:
a network communications interface;
a processor coupled with the network communications interface; and
a memory coupled with and readable by the processor and storing therein a set of instructions which, when executed by the processor, causes the processor to:
maintain a set of player preferences for a user of a mobile device;
generate an electronic record defining a player pool;
define a rule for the player pool, the rule defining handling of results of gaming activity in which members of the player pool participate and handling of a player pool amount at an occurrence of a predetermined event;
based on the set of player preferences and information in the electronic record defining the player pool, sending a notification to the mobile device, the notification indicating existence of the player pool;
receive, through the network communications interface, an electronic message indicating a request by the user of the mobile device to join the player pool;
update the electronic record defining the player pool to indicate addition of the user of the mobile device to the player pool;
receive, through the network communications interface, an indication of a contribution amount made by the user of the mobile device to the player pool;
update the electronic record defining the player pool to increment a player pool amount based on the contribution amount made by the user of the mobile device;
monitor, through the network communications interface, gaming activity within the gaming venue by the user of the mobile device; and
update the player pool amount in the electronic record defining the player pool based on monitoring the gaming activity of the user of the mobile device and the rule for the player pool, wherein the set of instructions to update the player pool amount in the electronic record defining the player pool based on monitoring the gaming activity of the user of the mobile device and the rule for the player pool comprises a set of instructions to:
based on detection of a win of a first amount in the gaming activity of the first participant, determine whether the first amount satisfies the rule for the player pool; and
based on a determination that the first amount does not satisfy the rule, award the first amount to the first participant instead of the player pool.

10. The pool management system of claim 9, wherein the player pool comprises a plurality of participants including the user of the mobile device and wherein the player pool amount is available to the plurality of participants as game player credit within the gaming venue.

11. The pool management system of claim 10, wherein the predetermined event comprises an outcome a game detected while monitoring the gaming activity of the user of the mobile device and wherein the rule for the player pool defines a distribution of a prize amount of the game between the plurality of participants.

12. The pool management system of claim 11, wherein the distribution of the prize amount is based on a percentage of the player pool amount contributed by each of the plurality of participants.

13. The pool management system of claim 11, wherein the distribution of the prize amount is based on a game play amount of each of the plurality of participants.

14. The pool management system of claim 9, wherein the notification indicating existence of the player pool further comprises an indication of an incentive to join the player pool.

15. The pool management system of claim 9, wherein the notification indicating existence of the player pool is sent to the user based on the set of player preferences indicating that the user of the mobile device has opted into receiving notification of available player pools.

16. The pool management system of claim 9, wherein the contribution amount made by the user of the mobile device to the player pool is deducted from a mobile wallet account associated with the user of the mobile device.

17. A method for managing a player pool in a gaming venue, the method comprising:
receiving, by a pool management system, an electronic message indicating a request by a player to initiate a player pool;
generating, by the gaming venue system, an electronic record defining the player pool;
defining, by the pool management system, a rule for the player pool, the rule defining handling of results of gaming activity in which the player participates and handling of a player pool amount at an occurrence of a predetermined event;
receiving, by the pool management system, electronic messages, each message indicating a request by a participant of a plurality of participants to become a member in the player pool;
updating, by the pool management system, the electronic record defining the player pool to indicate addition of each participant to the player pool;
receiving, by the gaming venue system, an indication of a contribution amount made by each participant to the player pool;
updating, by the pool management system, the electronic record defining the player pool to increment the player pool amount based on the contribution amount made by each participant;

monitoring, by the pool management system, the gaming activity of the player within the gaming venue; and updating, by the pool management system, the player pool amount in the electronic record defining the player pool based on monitoring the gaming activity of the player and the rule, wherein updating, by the pool management system, the player pool amount in the electronic record defining the player pool based on monitoring the gaming activity of the player and the rule:

based on detecting a win of a first amount in the gaming activity of the player, determining whether the first amount satisfies the rule for the player pool; and based on determining that the first amount does not satisfy the rule, awarding the first amount to the player instead of the player pool.

18. The method of claim 17, wherein the predetermined event comprises an outcome a game detected while monitoring the gaming activity of the player and wherein the rule for the player pool defines a distribution of a prize amount of the game.

19. The method of claim 18, wherein the rule for the player pool defines distribution of the prize amount of the game based on a contribution of each participant to the player pool amount.

20. The method of claim 18, wherein the rule for the player pool defines distribution of the prize amount of the game between each participant and the player.

* * * * *